(12) United States Patent
Hu

(10) Patent No.: US 11,067,224 B2
(45) Date of Patent: Jul. 20, 2021

(54) MULTI-FUNCTIONAL HOOK

(71) Applicant: DONGGUAN JIAMING METAL PRODUCTS CO., LTD., Guangdong (CN)

(72) Inventor: Songqing Hu, Guangdong (CN)

(73) Assignee: DONGGUAN JIAMING METAL PRODUCTS CO., LTD., Guangdong (CN)

( * ) Notice: Subject to any disclaimer, the term of this patent is extended or adjusted under 35 U.S.C. 154(b) by 105 days.

(21) Appl. No.: 16/699,239

(22) Filed: Nov. 29, 2019

(65) Prior Publication Data

US 2021/0095814 A1 Apr. 1, 2021

(30) Foreign Application Priority Data

Sep. 27, 2019 (CN) .......................... 201921634796.0

(51) Int. Cl.
*A47G 29/00* (2006.01)
*F16M 13/02* (2006.01)

(52) U.S. Cl.
CPC ................................. *F16M 13/022* (2013.01)

(58) Field of Classification Search
CPC ...... F16M 13/022; F16M 13/04; F16B 45/00; A47G 29/083; A47G 1/20; A47G 25/06; A47F 5/0006; B60R 7/10
USPC .... 248/215, 304, 307, 308, 309.1, 339, 328, 248/441.1, 444, 447, 454, 458, 460, 248/346.01, 346.03, 346.06, 914, 915; 211/85; 446/72, 73; 24/343, 369
See application file for complete search history.

(56) References Cited

U.S. PATENT DOCUMENTS

| | | | | |
|---|---|---|---|---|
| 6,921,561 B1* | 7/2005 | Maier | .................... | A47G 33/08 24/343 |
| 7,887,017 B2* | 2/2011 | Moran | ...................... | B44C 5/00 248/339 |
| 7,988,116 B2* | 8/2011 | Kacines | ................. | A47G 33/04 248/309.1 |
| 10,791,862 B2* | 10/2020 | Schwab | ................... | A47K 1/09 |
| 2005/0000068 A1* | 1/2005 | Waszak | ................. | A47F 5/0068 24/493 |
| 2008/0083862 A1* | 4/2008 | Salatka | ................ | A47G 29/083 248/308 |
| 2019/0107248 A1* | 4/2019 | Hendricks | ............... | F16B 2/065 |

* cited by examiner

*Primary Examiner* — Todd M Epps
(74) *Attorney, Agent, or Firm* — Demian K. Jackson; Jackson IPG PLLC

(57) ABSTRACT

A multi-functional hook, which comprises a body portion, and a positioning portion and a hook portion arranged on a back surface of the body portion, wherein the back surface of the body portion is provided with a first mounting portion and a second mounting portion, the first mounting portion is provided with a first rotating shaft, the positioning portion is pivoted on the first rotating shaft, an inside end of the positioning portion is provided with a rotating portion and a limiting portion, the rotating portion is arranged on one side of the hook portion, and the positioning portion can rotate along the rotating portion towards the positioning portion; and the second mounting portion is provided with a second rotating shaft, and an inside end of the hook portion is pivoted on the second rotating shaft and can rotate along the second rotating shaft.

10 Claims, 11 Drawing Sheets

US 11,067,224 B2

MULTI-FUNCTIONAL HOOK

FIELD OF THE INVENTION

The invention relates to a hook, and more particularly, to a multi-functional hook.

BACKGROUND OF THE INVENTION

At present, more and more people like to hang ornaments on surfaces of fireplaces, cooking benches, shelves, counters, windowsills, tabletops and other household objects in daily life. These ornaments comprise Christmas socks, Christmas hats, Christmas lights, decorative wreaths, etc. A nail is usually used in a traditional way to hang an ornament, but the use of the nail can often damage a surface of a household object, and the nail cannot be used for bricks, marble, granite and other relatively hard surfaces. Moreover, when the ornament is removed, the nail is easy to be scraped or impacted by people, thus having certain potential safety hazards.

In addition, most hooks in current market are designed for a single purpose and are basically disposed as waste after Christmas or when they are not needed, thus causing waste of resources, which is contrary to the current global promotion of green environmental protection.

SUMMARY OF THE INVENTION

On this basis, the invention is intended to provide a multi-functional hook.

A multi-functional hook comprises a body portion, and a positioning portion and a hook portion arranged at intervals on a back surface of the body portion, wherein the hook portion is arranged below the positioning portion; the back surface of the body portion is provided with a first mounting portion, and the first mounting portion is provided with a first rotating shaft; the positioning portion is pivoted on the first rotating shaft, an inside end of the positioning portion is provided with a limiting portion and a rotating portion, the rotating portion is arranged on one side of the hook portion, the positioning portion is arranged on one side far away from the hook portion, and the positioning portion can rotate downwardly along the rotating portion.

Further, an end surface of the rotating portion is arranged in a circular arc shape, and an end surface of the limiting portion contacted with an inside surface of the body portion is arranged vertical to a lower surface of the positioning portion.

Further, the back surface of the body portion is further provided with a second mounting portion, the second mounting portion is provided with a second rotating shaft, and an inside end of the hook portion is pivoted on the second rotating shaft and can rotate along the second rotating shaft.

Further, the inside end of the hook portion is also provided with a limiting portion and a rotating portion arranged above the limiting portion, an end surface of the rotating portion of the hook portion is arranged in a circular arc shape, and an end surface of the limiting portion of the hook portion contacted with an inside surface of the body portion is vertically arranged.

Further, a middle portion of the hook portion is concaved downwardly to form a hook-shaped structure, and an ornament is hung in the concaved structure.

Further, the hook portion is fixed or integrally formed on an inside surface of the body portion.

Further, a bottom surface of the hook portion is arranged in a plane; and when the hook is used as an ornament, a bottom surface of the hook and an end portion of the positioning portion are both attached to a placing platform.

Further, when an ornament is hung, the positioning portion is horizontally extended, the body portion is vertically extended, and an outside end of the hook portion is obliquely extended upwardly.

Further, when the hook is used as an ornament, the positioning portion rotates downwardly and the hook portion rotates upwardly until an outside end of the hook portion is abutted against an inside surface of the positioning portion, and bottom ends of the positioning portion and the body portion are both abutted against a placing platform.

To sum up, the invention has the beneficial effects that: the hook can safely fix an ornament on an edge of a surface of a household object without damages to the surface of the object where the article is placed and potential safety hazards of damaging the human body. Therefore, article storage capacity, adaptability and safety are improved. When the hook is not in use, the hook can also be flexibly adjusted to be placed on a platform as an ornament or the product can be hung on a Christmas tree and other places as a hanging ornament through a rope, so that a use value of the product is greatly improved, and waste of the product is avoided. Moreover, the hook of the invention can be folded for storage, which not only reduces packaging materials and saves a packaging space and a space occupied by transportation, but also reduces packaging and transportation costs, and has a strong practicability and a great popularization significance.

DETAILED DESCRIPTION OF THE PREFERRED EMBODIMENTS

In order to more clearly show the technical solutions of the invention, the invention is further described hereinafter with reference to the drawings.

Figure 1:
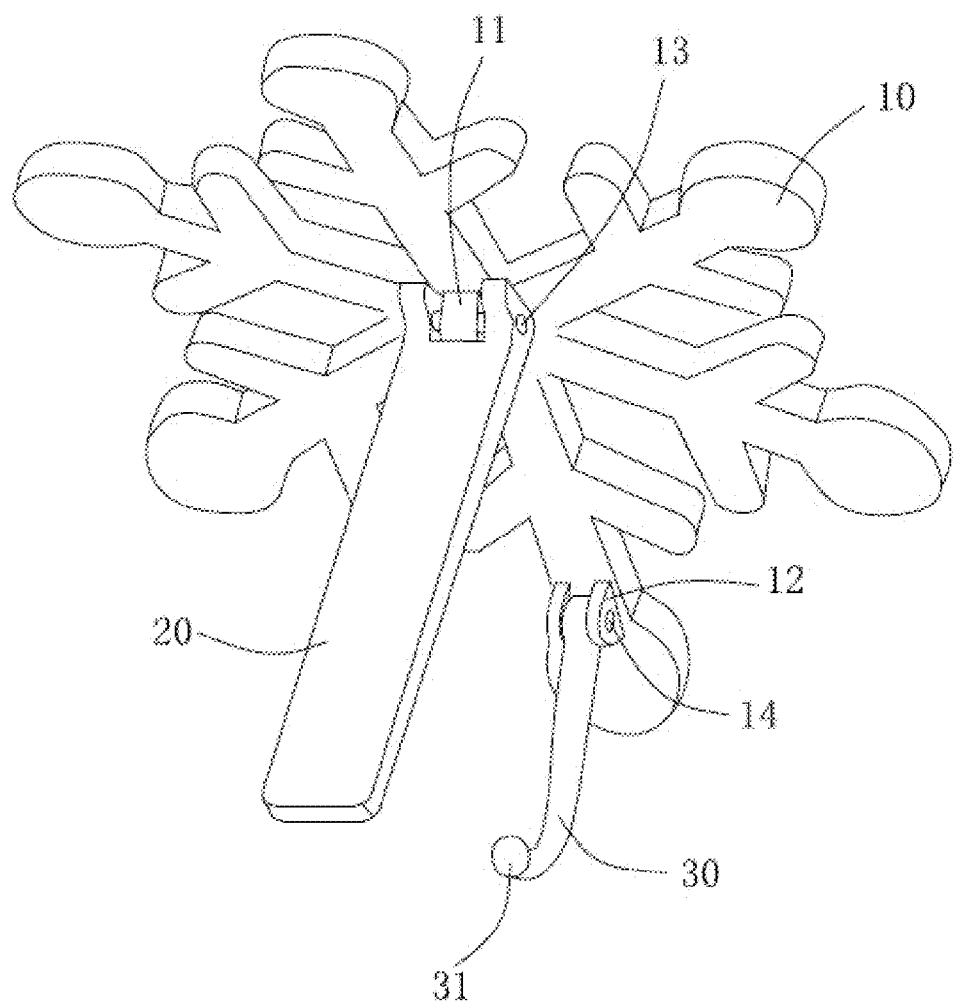
FIG. 1 is a structure diagram of a first embodiment of a multi-functional hook of the invention.
Figure 2:
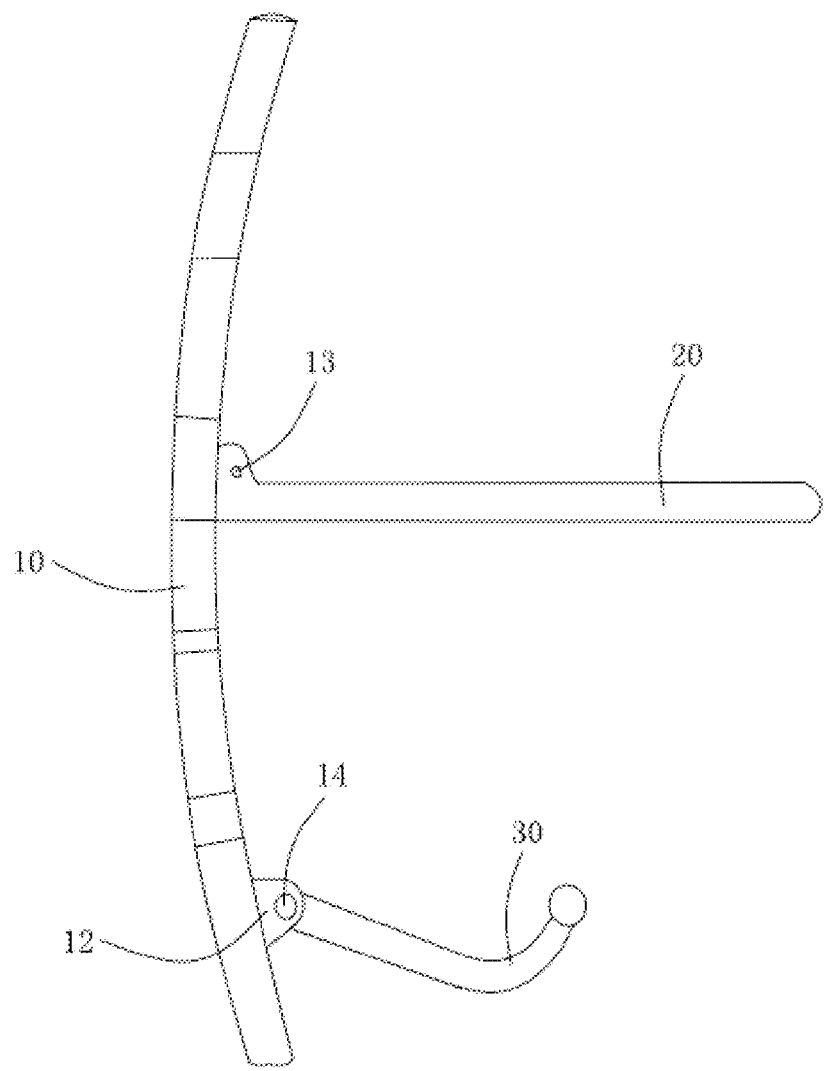
FIG. 2 is a side view of the hook in FIG. 1.
Figure 3:
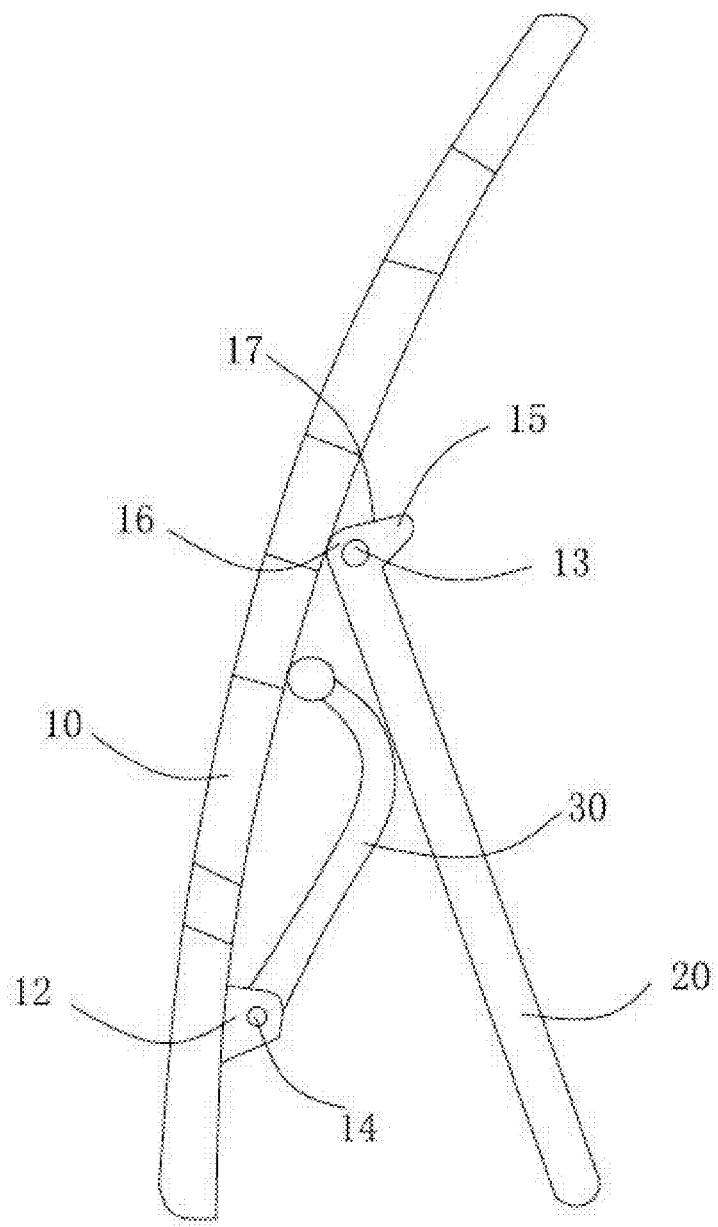
FIG. 3 is a diagram illustrating a use state of the hook in FIG. 2 when used as an ornament.

FIG. 1 to FIG. 3 illustrate a multi-functional hook provided by the invention, wherein the multi-functional hook is use for safely fixing an ornament on edges of surfaces of household objects such as fireplaces, tables, cabinets and the like; and the multi-functional hook can be moved to any required position according to requirements without damages to the surface of the object where the article is placed and potential safety hazards of damaging the human body. Therefore, article storage capacity, adaptability and safety are improved.

The multi-functional hook comprises a body portion 10, a positioning portion 20 and a hook portion 30, the positioning portion 20 and the hook portion 30 are both arranged on a back surface of the body portion 10, and the positioning portion 20 and the hook portion 30 are arranged at intervals.

The back surface of the body portion 10 is provided with a first mounting portion 11 and a second mounting portion 12, the first mounting portion 11 is provided with a first rotating shaft 13, and the second mounting portion is provided with a second rotating shaft 14. An inside end of the positioning portion 20 is pivoted on the first rotating shaft 13, and an inside end of the hook portion 30 is pivoted on the second rotating shaft 14 and can rotate along the second rotating shaft 14.

The inside end of the positioning portion 20 is also provided with a limiting portion 15 and a rotating portion 16, and the rotating portion 16 is arranged on one side of the hook portion 30. An end surface of the rotating portion 16 is arranged in a circular arc shape, and an end surface of the limiting portion 15 is horizontally arranged. The positioning portion 20 can rotate along the rotating portion 16 towards the hook portion 30, and when the positioning portion 20 is horizontally arranged, an end surface 17 of the positioning portion 15 is attached to an inside surface of the body portion 10. The limiting portion 15 limits the positioning portion 20, so that the positioning portion 20 can only rotate to a horizontal position at most in a direction far away from the hook portion 30, so that when the positioning portion 20 can be stably placed on a horizontal plane, the positioning portion 20 cannot turn over. It can be understood that the inside end of the hook portion 30 is also provided with a limiting portion of the same structure and a rotating portion arranged above the limiting portion, and an end surface of the limiting portion of the hook portion contacted with an inside surface of the body portion is vertically arranged.

In the embodiment, the positioning portion 20 is arranged in a horizontally extended flat plate, and the inside surface of the positioning portion 20 contacted with the platform is also provided with an anti-skid adhesive layer, so that a placing stability of the positioning portion 20 can be improved. A curved hook portion of the hook portion 30 extends towards the positioning portion 20, an outside end of the hook portion 30 is also provided with a limiting ball 31, and an outer diameter of the limiting ball 31 is larger than that of the hook portion 30, so as to limit the ornament.

The body portion 10 can be arranged in various shapes and structures according to requirements, such as snowflakes, snowmen, trees, and the like. When the multi-functional hook is used, the positioning portion 20 is horizontally placed on horizontal surfaces of fireplaces, cooking benches, counters, shelves, windowsills, tables or other articles, while the body portion 10 is vertically extended on a side surface of the article. A variable hook portion of the hook portion 30 is tilted upwardly towards an inner side of the body portion 10, and the hook portion 30 is used for directly hanging Christmas socks, Christmas hats, Christmas lights, decorative wreaths and other articles.

When the multi-functional hook is not in use, an angle of the hook can be flexibly adjusted to support the ornament placed on the platform. The specific operation is that: the positioning portion 20 rotates towards the hook portion 30, and then the hook portion 30 rotates towards the positioning portion 20 until an outside surface of the hook portion 30 is contacted with an inside surface of the positioning portion 20. At this time, the body portion 10, the hook portion 30 and the positioning portion 20 form a support structure. Therefore, the hook can be stably placed on the platform as an ornament, thus improving a value of the product and avoiding the product from being directly discarded after Christmas or when the product is not needed.

Figure 4:
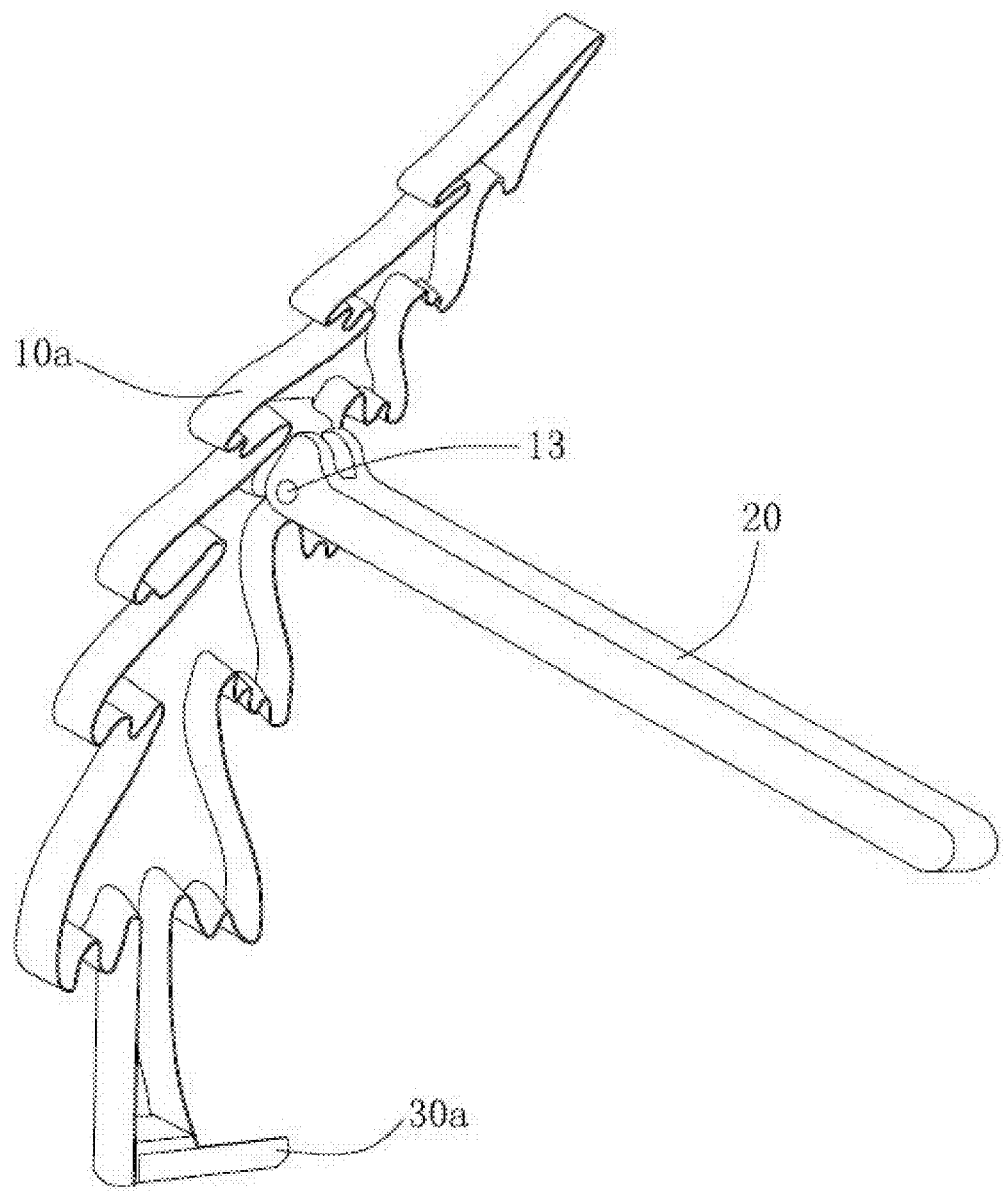
FIG. 4 is a structure diagram of a second embodiment of the multi-functional hook of the invention.
Figure 5:
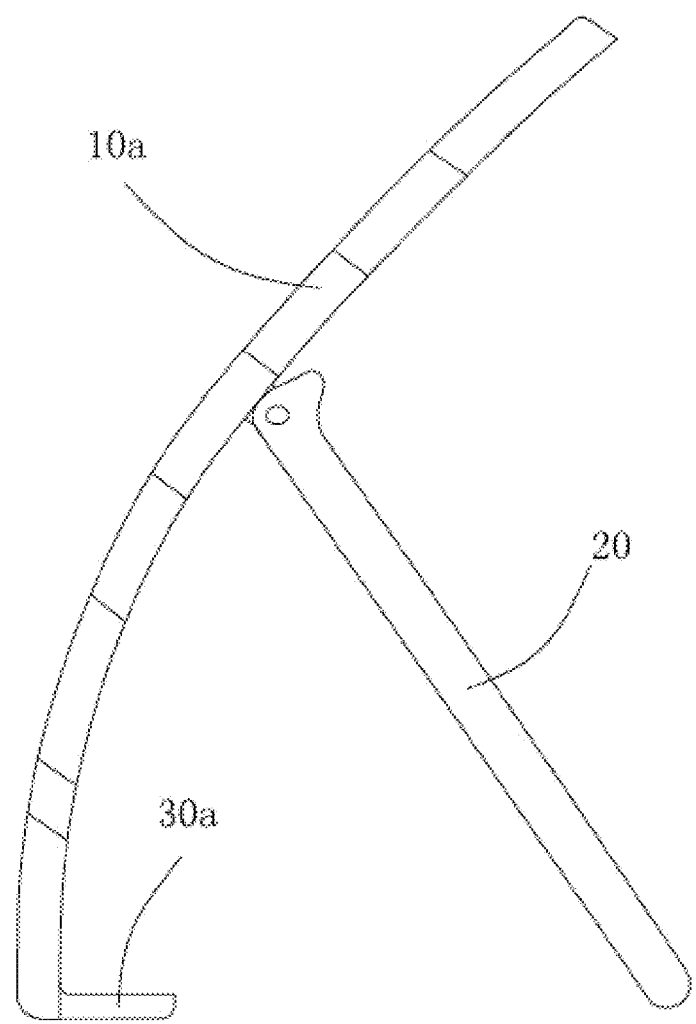
FIG. 5 and FIG. 6 are diagrams illustrating two different use states of the hook in FIG. 4.
Figure 6:
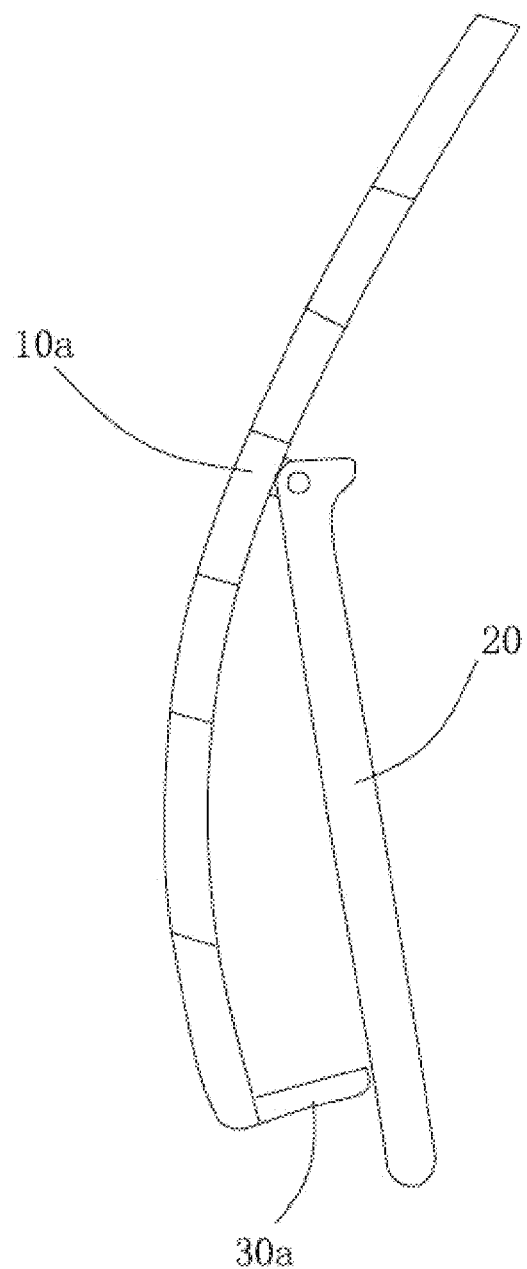
Figure 7:
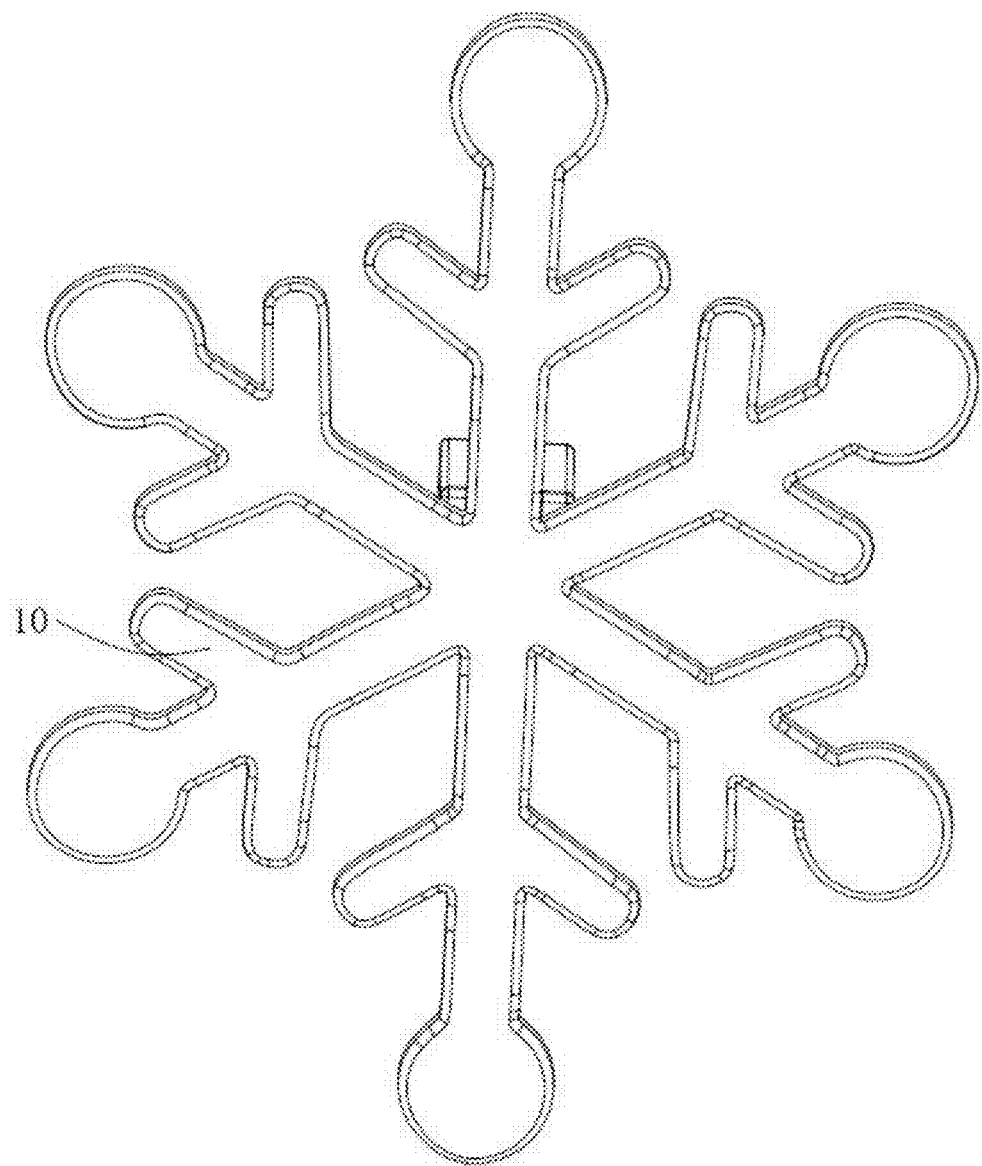
FIG. 7 to FIG. 11 illustrate five front shapes of a body portion.
Figure 8:
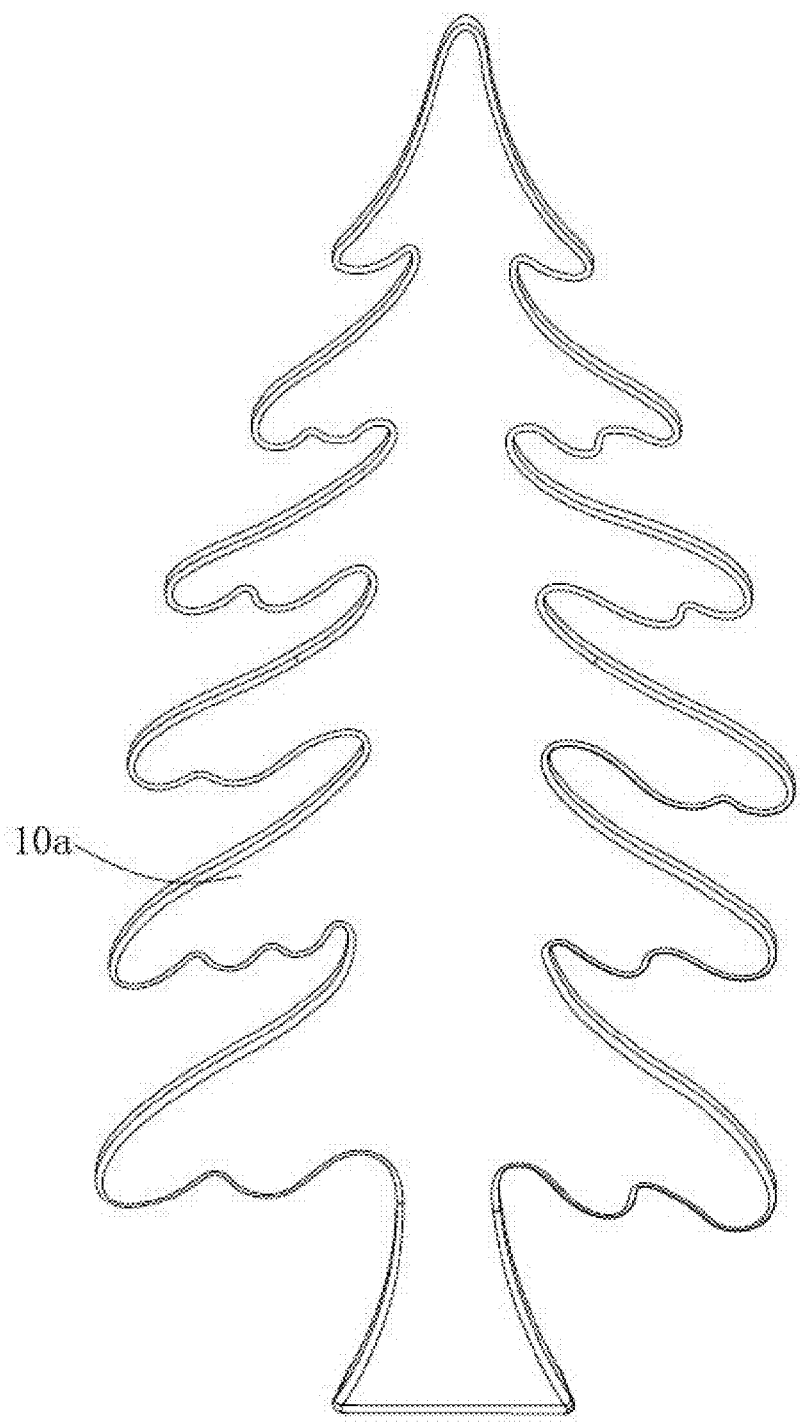
Figure 9:
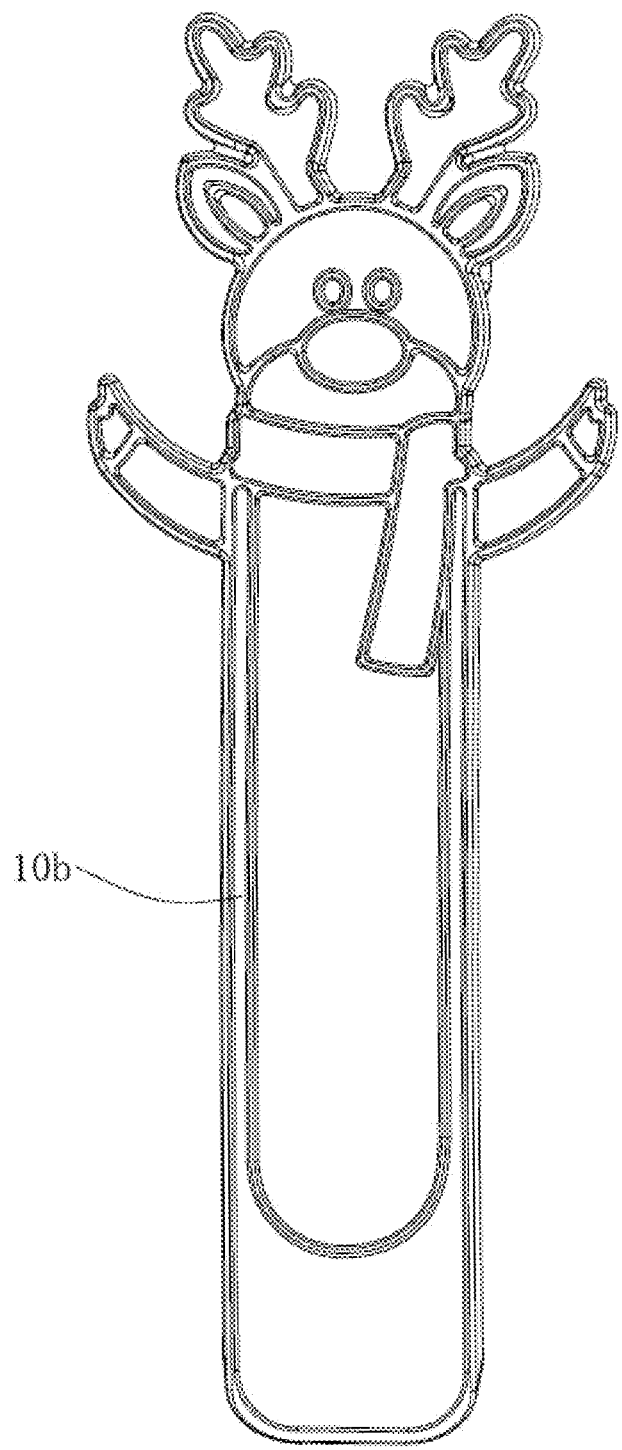
Figure 10:
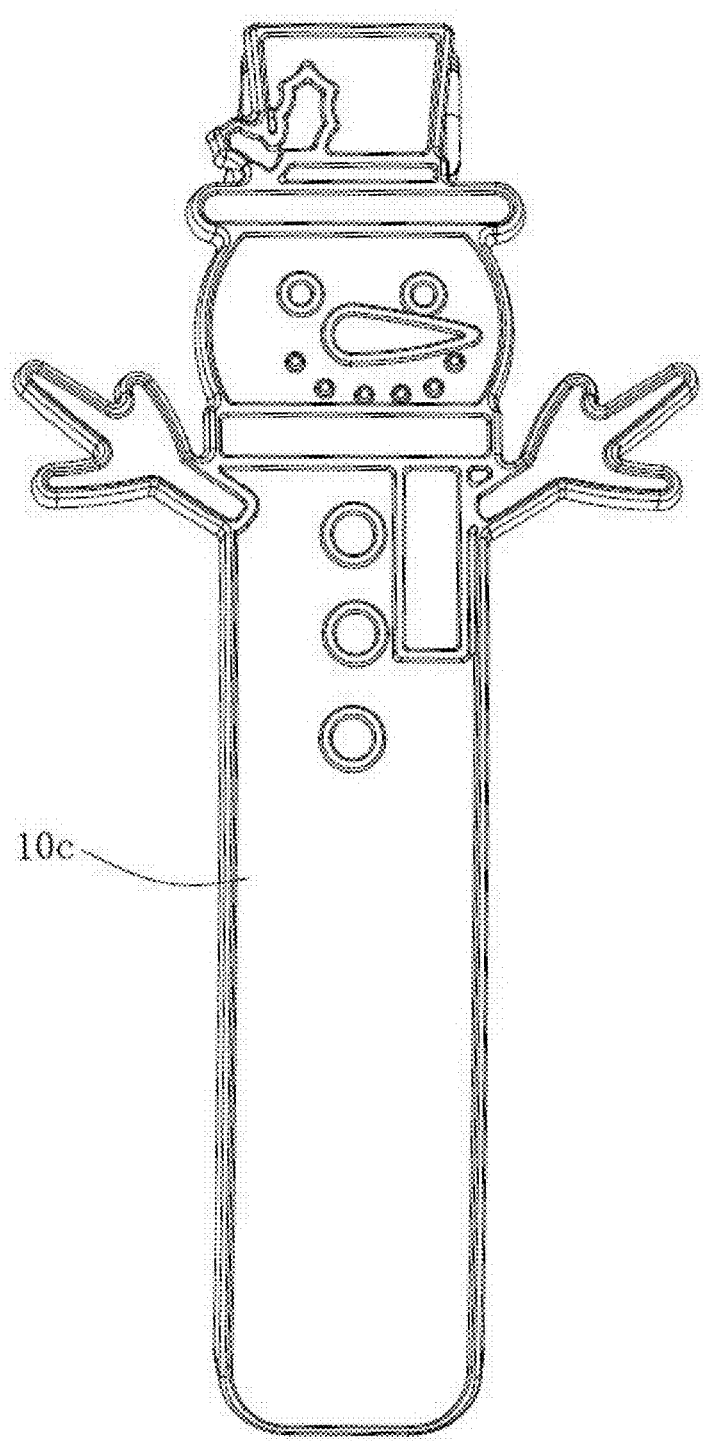
Figure 11:
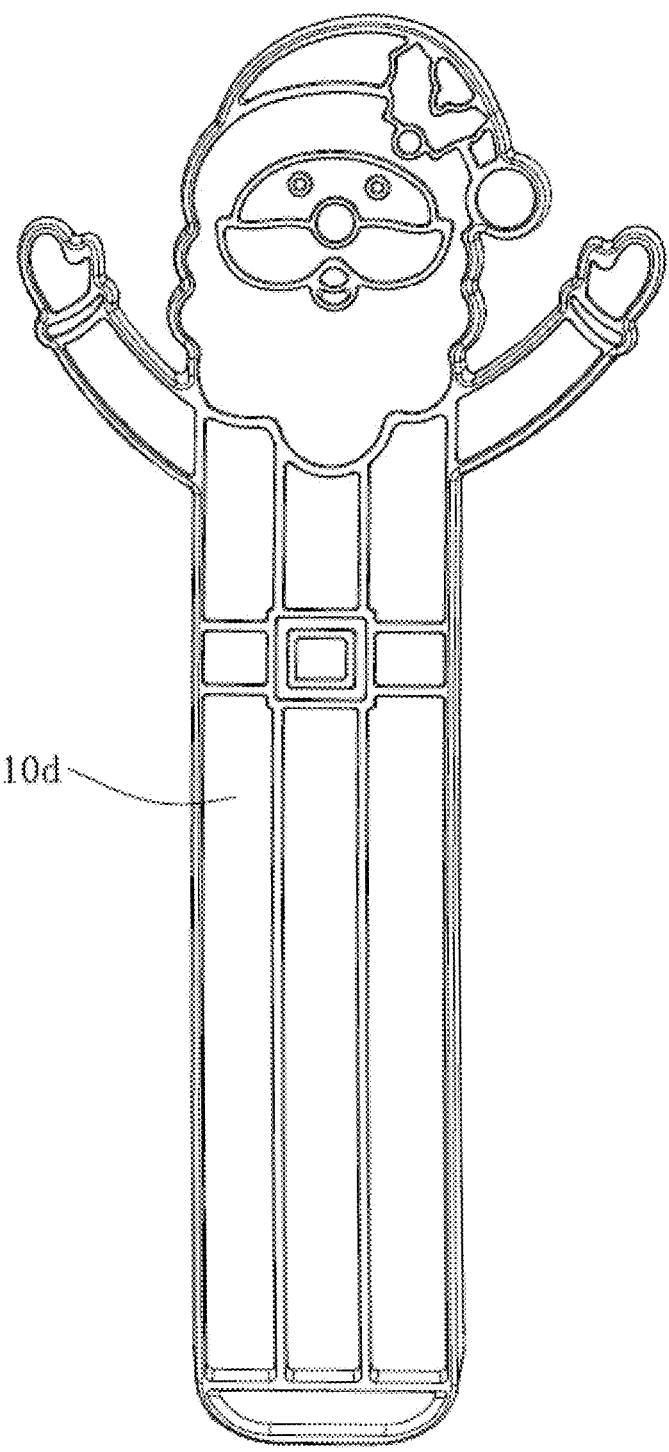

FIG. 4 to FIG. 6 illustrate a second embodiment of the multi-functional hook of the invention, wherein a structure of the hook in the embodiment is basically the same as that of the hook in the first embodiment, except that the hook portion 30a is fixedly mounted or integrally formed on the body portion 10a. In addition, in the embodiment, the hook portion 30a obliquely extends upwardly from a mounting end thereof to a free end. Therefore, it is convenient to hang the ornament, and the ornament is not easy to fall off. When the hook does not need to hang the ornament, the hook can be used as an ornament with two placing modes. The first placing mode is that the hook portion 30a is placed horizontally, the positioning portion 20 rotates and is abutted against a horizontal plane, and the positioning portion 20 and a bottom surface of the hook portion 30a form a support structure, so that the hook can be stably placed on the platform. The second placing mode is that the positioning portion 20 rotates downwardly until the inside surface thereof is contacted with the outside end of the hook portion 30a.

To sum up, the invention has the beneficial effects that: the hook can safely fix an ornament on an edge of a surface of a household object without damages to the surface of the object where the article is placed and potential safety hazards of damaging the human body. Therefore, article storage capacity, adaptability and safety are improved. When the hook is not in use, the hook can also be flexibly adjusted to be placed on a platform as an ornament or the product can be hung on a Christmas tree and other places as a hanging ornament through a rope, so that a use value of the product is greatly improved, and waste of the product is avoided. Moreover, the hook of the invention can be folded for storage, which not only reduces packaging materials and saves a packaging space and a space occupied by transportation, but also reduces packaging and transportation costs, and has a strong practicability and a great popularization significance.

The embodiments above only express one implementation of the invention, which is described in a relatively specific and detailed manner, but cannot be understood as limiting the scope of the invention patent. It should be pointed out that many deformations and improvements can be made by those of ordinary skills in the art without deviating from the concept of the invention, and all the deformations and improvements belong to the scope of protection of the invention. Therefore, the scope of protection of the invention patent shall be subject to the claims attached.

What is claimed is:

1. A multi-functional hook, comprising a body portion, and a positioning portion and a hook portion arranged at intervals on a back surface of the body portion, wherein the hook portion is arranged below the positioning portion; the back surface of the body portion is provided with a first mounting portion, and the first mounting portion is provided with a first rotating shaft; the positioning portion is pivoted on the first rotating shaft, an inside end of the positioning portion is provided with a limiting portion and a rotating portion, the rotating portion is arranged on one side of the hook portion, the positioning portion is arranged on one side far away from the hook portion, and the positioning portion can rotate downwardly along the rotating portion.

2. The multi-functional hook according to claim 1, wherein an end surface of the rotating portion is arranged in a circular arc shape, and an end surface of the limiting portion contacted with an inside surface of the body portion is arranged vertical to a lower surface of the positioning portion.

3. The multi-functional hook according to claim 1, wherein the back surface of the body portion is further provided with a second mounting portion, the second mounting portion is provided with a second rotating shaft, and an inside end of the hook portion is pivoted on the second rotating shaft and can rotate along the second rotating shaft.

4. The multi-functional hook according to claim 3, wherein the inside end of the hook portion is also provided with a limiting portion and a rotating portion arranged above the limiting portion, an end surface of the rotating portion of the hook portion is arranged in a circular arc shape, and an end surface of the limiting portion of the hook portion contacted with an inside surface of the body portion is vertically arranged.

5. The multi-functional hook according to claim 3, wherein a middle portion of the hook portion is concaved downwardly to form a hook-shaped structure, and an ornament is hung in the concaved structure.

6. The multi-functional hook according to claim 3, wherein when the hook is used as an ornament, the positioning portion rotates downwardly and the hook portion rotates upwardly until an outside end of the hook portion is abutted against an inside surface of the positioning portion, and bottom ends of the positioning portion and the body portion are both abutted against a placing platform.

7. The multi-functional hook according to claim 1, wherein the hook portion is fixed or integrally formed on an inside surface of the body portion.

8. The multi-functional hook according to claim 7, wherein a bottom surface of the hook portion is arranged in a plane; and when the hook is used as an ornament, a bottom surface of the hook and an end portion of the positioning portion are both attached to a placing platform.

9. The multi-functional hook according to claim 7, wherein when the hook is used as an ornament, the positioning portion rotates downwardly and the hook portion rotates upwardly until an outside end of the hook portion is abutted against an inside surface of the positioning portion, and bottom ends of the positioning portion and the body portion are both abutted against a placing platform.

10. The multi-functional hook according to claim 1, wherein when an ornament is hung, the positioning portion is horizontally extended, the body portion is vertically extended, and an outside end of the hook portion is obliquely extended upwardly.

* * * * *